US009317615B2

(12) United States Patent
Burckart et al.

(10) Patent No.: US 9,317,615 B2
(45) Date of Patent: *Apr. 19, 2016

(54) MULTI-DOMAIN CO-BROWSING UTILIZING LOCALIZED STATE MANAGEMENT

(75) Inventors: Erik J. Burckart, Raleigh, NC (US); Andrew Ivory, Wake Forest, NC (US); Todd E. Kaplinger, Raleigh, NC (US); Aaron K. Shook, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 934 days.

This patent is subject to a terminal disclaimer.

(21) Appl. No.: 13/404,268

(22) Filed: Feb. 24, 2012

(65) Prior Publication Data
US 2012/0297007 A1 Nov. 22, 2012

Related U.S. Application Data

(63) Continuation of application No. 13/112,563, filed on May 20, 2011, now Pat. No. 8,856,259.

(51) Int. Cl.
*G06F 15/16* (2006.01)
*G06F 17/30* (2006.01)
(Continued)

(52) U.S. Cl.
CPC .......... *G06F 17/30873* (2013.01); *H04L 67/02* (2013.01); *H04L 67/142* (2013.01); *H04L 61/1511* (2013.01)

(58) Field of Classification Search
CPC . G06F 17/30873; H04L 67/142; H04L 67/02; H04L 61/1511
USPC ......... 709/202, 204, 205, 208, 217, 223, 225, 709/227, 228, 248
See application file for complete search history.

(56) References Cited

U.S. PATENT DOCUMENTS 7,660,899 B2 * 2/2010 Gavrilescu et al. ........... 709/227
7,698,364 B2 4/2010 Andrew et al.
2002/0143878 A1 10/2002 Birnbaum et al.
(Continued)

OTHER PUBLICATIONS

Raphael De Oliveira Santos, "A Comprehensive Environment for Collaborative Web Browsing—Pragmatic Specification and Development Approach," Master Thesis, Vitoria—ES Brazil, 2009, Universidade Federal Do Espirito.

*Primary Examiner* — Mang Yeung
*Assistant Examiner* — Natali N Pascual Peguero
(74) *Attorney, Agent, or Firm* — Patents on Demand P.A.; Brian K. Buchheit; Scott M. Garrett

(57) ABSTRACT

A master and a slave computing device within a co-browsing session can be identified. The devices can be associated with a first Unified Resource Identifier (URI) where a portion of the URI is a fully qualified domain name of a Domain Name System (DNS) hierarchy. The devices can be associated with a co-browsing application. A request associated with a second URI from the master computing device can be detected. The second URI can share a root domain with the first URI. A portion of a master artifact associated with the master device can be conveyed to the slave device. The master artifact can be associated with state information of the session. A portion of a slave artifact linked to the slave device can be modified with the portion of the master artifact. The devices can be navigated to the second URI in response to the request.

20 Claims, 3 Drawing Sheets

(51) Int. Cl.
  *H04L 29/08* (2006.01)
  *H04L 29/12* (2006.01)

(56) References Cited

U.S. PATENT DOCUMENTS

| | | | |
|---|---|---|---|
| 2003/0105805 A1* | 6/2003 | Jorgenson | 709/203 |
| 2003/0156591 A1* | 8/2003 | Sorsa | 370/401 |
| 2005/0044233 A1* | 2/2005 | Cai et al. | 709/227 |
| 2005/0198162 A1 | 9/2005 | Bauer, Jr. et al. | |
| 2009/0138792 A1* | 5/2009 | Cudich et al. | 715/234 |
| 2009/0164581 A1* | 6/2009 | Bove et al. | 709/205 |
| 2009/0319672 A1 | 12/2009 | Reisman | |
| 2011/0119352 A1* | 5/2011 | Perov et al. | 709/218 |
| 2011/0225181 A1* | 9/2011 | Kubicki et al. | 707/769 |

\* cited by examiner

MULTI-DOMAIN CO-BROWSING UTILIZING LOCALIZED STATE MANAGEMENT

CROSS-REFERENCE TO RELATED APPLICATIONS

This application is a continuation of U.S. patent application Ser. No. 13/112,563, filed May 20, 2011 (pending), which is incorporated herein in its entirety.

BACKGROUND

The present invention relates to the field of co-browsing and, more particularly, to improving multi-domain co-browsing utilizing localized state management.

Web-based conferencing tools are frequently employed to enhance collaboration between users. One tool which is often utilized is co-browsing, which can permit two or more users to navigate the same networked resource (e.g., Web page) simultaneously within a session. For example, a user can navigate through multiple Web pages on a Web site on one computer while another user views the navigation using another computer. Often times Web sites can span multiple domains such as two sub-domains, which can restrict the use of many co-browsing applications.

Asynchronous Javascript and Extensible Markup Language (AJAX) communication is a commonly used mechanism amongst co-browsing applications. This mechanism is limited, however, by policies of traditional security models. For example, the same origin security policy restricts information exchange between co-browsing applications of different domains. Consequently, often times session information can be lost when co-browsing sessions span multiple domains and/or multiple co-browsing applications.

One current solution utilizes a proxy server as a routing mechanism to each of the domains involved in the co-browsing session. The drawback to this solution is that the proxy server needs to be configured to appropriately route requests to the appropriate domain server hosting the co-browsing application. This configuration can be time consuming and error-prone. Further, frequently the Uniform Resource Identifier (URI) patterns for co-browsing applications have similar patterns which results in URI rewrite rules that can be complex and difficult to maintain. In addition, the ability to share the session information between the co-browsing sessions is not available without exposing the session to security risks. For instance, explicitly configuring session cookies to be more global in nature can allow unauthorized entities access to content of the co-browsing session.

BRIEF SUMMARY

One aspect of the present invention can include a computer program product, a system, an apparatus, and a method for improving multi-domain co-browsing utilizing localized state management. A master and a slave computing device within a co-browsing session can be identified. The devices can be associated with a first Unified Resource Identifier (URI) where a portion of the URI is a fully qualified domain name of a Domain Name System (DNS) hierarchy. The devices can be associated with a co-browsing application. A request associated with a second URI from the master computing device can be detected. The second URI can share a root domain with the first URI. A portion of a master artifact associated with the master device can be conveyed to the slave device. The master artifact can be associated with state information of the session. A portion of a slave artifact linked to the slave device can be modified with the portion of the master artifact. The devices can be navigated to the second URI in response to the request.

Another aspect of the present invention can include a computer program product, a method, an apparatus, and a system for improving multi-domain co-browsing utilizing localized state management. A co-browsing engine can be able to perform co-browsing session state management and/or routing. The co-browsing session can be associated with a shared domain. The shared domain can be two or more networking resources having a common root domain of a Domain Name System hierarchy. The co-browsing session can be associated with a co-browsing application. The co-browsing application can be associated with an interface. The co-browsing engine can reside within a client computing device. A data store can be configured to store a state artifact associated with the co-browsing session. The state artifact can include a session identifier and/or a fully qualified domain name. The state artifact can be replicated to a client computing device in response to a co-browsing session request associated with the shared domain.

Yet another aspect of the present invention can include a computer program product, a system, an apparatus, and a method for improving multi-domain co-browsing utilizing localized state management. A request for a Uniform Resource Locator (URI) associated with a first co-browsing application can be received. The URI can be a fully qualified domain name of a Domain Name System hierarchy. The URI can share a common domain name with a historic URI. The first co-browsing application can be associated with a co-browsing session. The co-browsing session can be associated with a state artifact. The first co-browsing application can be associated with a client computing device. A state information of the state artifact associated with the first co-browsing application can be identified. The state information can be at least one of a session identifier and a domain. The state information of the state artifact can be replicated to a second co-browsing application. The second co-browsing application can be associated with a different computing device.

DETAILED DESCRIPTION

Figure 1:
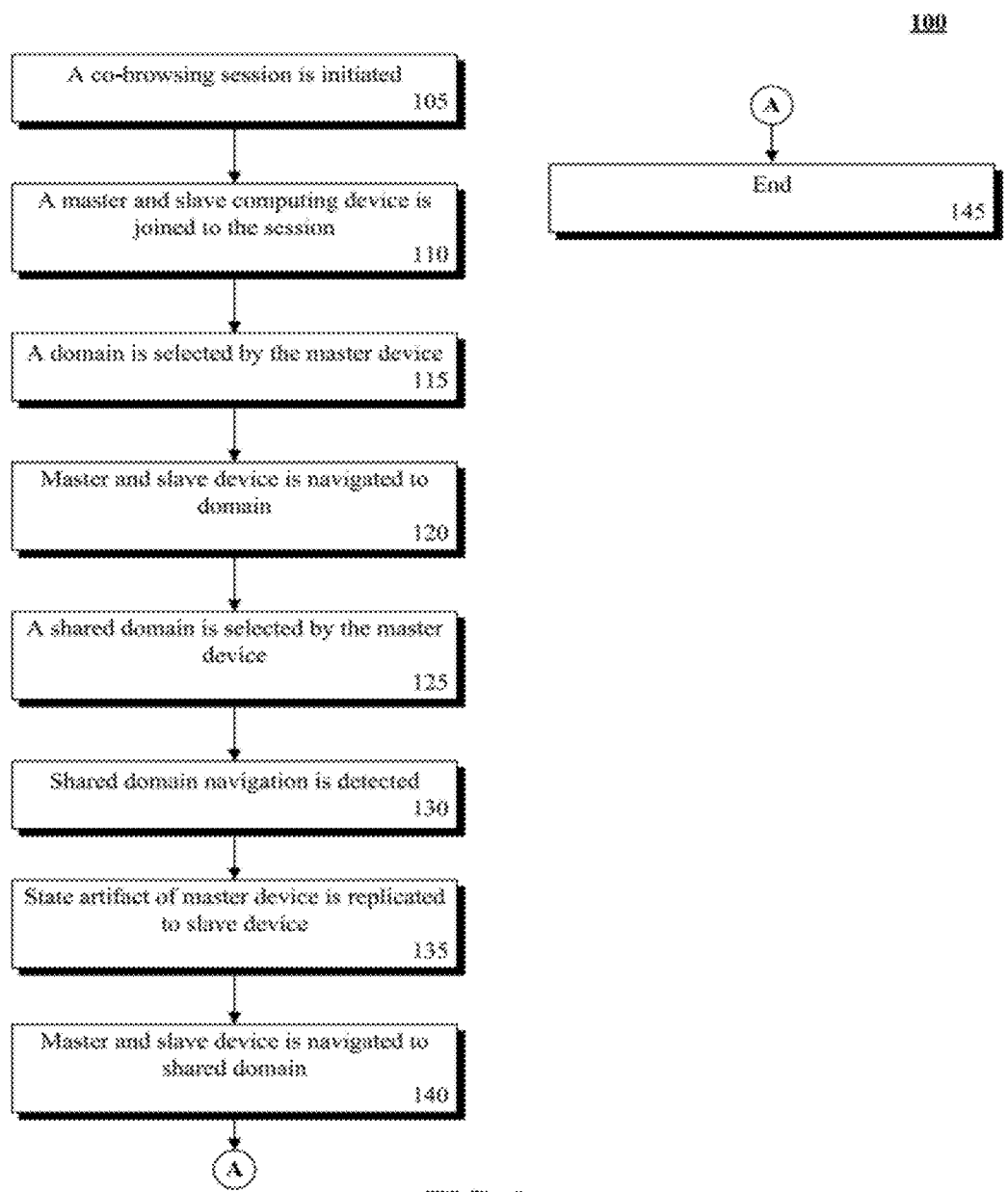
FIG. 1 is a schematic diagram illustrating a method for improving multi-domain co-browsing utilizing localized state management in accordance with an embodiment of the inventive arrangements disclosed herein.

The present disclosure is a solution for improving multi-domain co-browsing utilizing localized state management. In the solution, a co-browsing engine within a client computing device can be utilized to perform state management to enhance co-browsing sessions interacting with multiple domains. That is, the client computing device can perform routing and state management functionality traditionally performed by a proxy server. The co-browsing engine can identify fully qualified domain names and associated sub-domain requests within a co-browsing session. Utilizing a state artifact (e.g., Hypertext Transport Protocol cookie) engine can replicate state information for each device within the co-browsing session. In one embodiment, an HTTP cookie can be employed to maintain state information for each device associated with the co-browsing session. That is, the engine can permit stateful navigation to sub-domains within the co-browsing session.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a method 100 for improving multi-domain co-browsing utilizing localized state management in accordance with an embodiment of the inventive arrangements disclosed herein. Method 100 can be present in the context of system 200 and interface 300. In method 100, a co-browsing session can be established between a master computing device and a slave computing device via a co-browsing application. The master and slave computing device can be client computing devices communicatively linked to a co-browsing server. For example, co-browsing application can be a co-browsing widget executing within a Web browser. The master computing device can be utilized to perform state management to enhance co-browsing sessions interacting with shared domains. That is, the master computing device can perform routing and state management functionality traditionally performed by a proxy server. For example, a co-browsing application state can be persisted by the master computing device when a moderator navigates to a sub-domain from a root domain of a Web site.

As used herein, a master and slave computing device can be a computing device executing a co-browsing application within a computing environment. The co-browsing application can be associated with a co-browsing session. The master computing device can be a computing device able to store state information associated with the co-browsing session. The slave computing device can be a computing device able to receive state information from the master computing device. A co-browsing session can be a joint navigation of a networked resource by two or more computing devices. Co-browsing can include, but is not limited to, joint navigation, screen sharing, desktop sharing, application sharing, a Web conference having co-browsing portions, a text chat associated with co-browsing capabilities, and the like. A networked resource can include, but is not limited to, a Uniform Resource Identifier (URI), a Uniform Resource Locator, and the like. For example, a URI can be a file stored within a server computer addressable by a fully qualified domain name and a file name. Networking resource can include, but is not limited to, a network protocol, a domain name, a networking port, a resource path, a resource name, and the like. For example, a networking resource can be a Web page associated with a Web site (e.g., http://abc.domain.com/home.html).

As used herein, a shared domain can be two or more networking domains sharing a common root domain of a Domain Name System (DNS) hierarchy. The root domain can include an Internet root domain, a network domain, a subdomain, and the like. For example, the root domain can be a root Internet domain such as www.example.com. Shared domain can include, but is not limited to a URI, URL, Uniform Resource Name, and the like. In one instance, shared domain can include an Internet Protocol address associated with different ports. For example, an IP address can be associated with two networking ports such as port eighty and port ninety. Shared domain can include, but is not limited to, alphanumeric characters, numeric characters, and the like. It should be appreciated that the disclosure is not limited to Internet domains and can be extended to accommodate any namespace system where same origin policies constrain the system.

In step 105, a co-browsing session can be initiated. The co-browsing session can be initiated via one or more traditional and/or proprietary procedures. In one embodiment, the co-browsing session can be initiated via a master computing device. In the embodiment, the master computing device can designate slave computing devices which can join the session. In step 110, a master and slave computing device can be joined to the session. The master and slave computing device can be identified based on permissions, configuration options and the like. For example, a master device can be determined based on a moderator status of a user. In step 115, a domain can be selected by the master computing device. Domain selection can be performed automatically and/or manually. In one instance, domain selection can be an automated Hypertext Transport Protocol (HTTP) redirection to a domain. In another instance, the domain can be selected manually via user input. For example, a user can utilize a human interface device (e.g., keyboard) to input a Uniform Resource Locator (URL).

In step 120, the master and slave computing device can be navigated to the selected domain. Navigation can include, but is not limited to, one or more HTTP requests, content rendering, Asynchronous JavaScript and Extensible Markup Language (AJAX) requests, and the like. In step 125, a shared domain can be selected by the master device. The shared domain can be selected in response to an automatic and/or manual event occurrence. For instance, shared domain selection can be performed when a user selects a hyperlink. In step 130, shared domain navigation can be detected. Detection can be performed via one or more traditional and/or proprietary mechanisms. In one instance, detection can be performed via request interception. In the instance, an HTTP request can be analyzed prior to conveyance to determine when a shared domain is requested.

In step 135, a state artifact of the master computing device can be replicated to the slave device. The state artifact can be one or more entities associated with the state of the co-browsing session. In one instance, a state artifact stored within master computing device can be copied and conveyed to the slave computing device. In the instance, the state artifact can be an HTTP cookie which can be utilized to synchronize the state between the master and slave device. It should be understood that the state artifact can be selectively replicated. That is, state information can be selectively replicated to maintain security policies. In step 140, the master and slave computing device can be navigated to the shared domain. In step 145, the method can end.

Drawings presented herein are for illustrative purposes only and should not be construed to limit the invention in any regard. In method 100, step 115-145 can be performed each time a domain is selected. That is, the method can be continuously executed during a co-browsing session to enable state maintenance across multiple domains. It should be appreciated that method 100 can be applied to any co-browsing session to permit statefulness of the session. For example, the method 100 can be applied to a co-browsing session through the manual activation of a configuration option. It should be understood that method 100 can be utilized in the context of multiple master computing devices, multiple slave computing devices, and the like.

In one embodiment, method 100 can be implemented in the presence of a master and slave computing device change during the course of a session. In the embodiment, as a computing device privilege is elevated and/or restricted, the method can be utilized to maintain session state.

Figure 2:
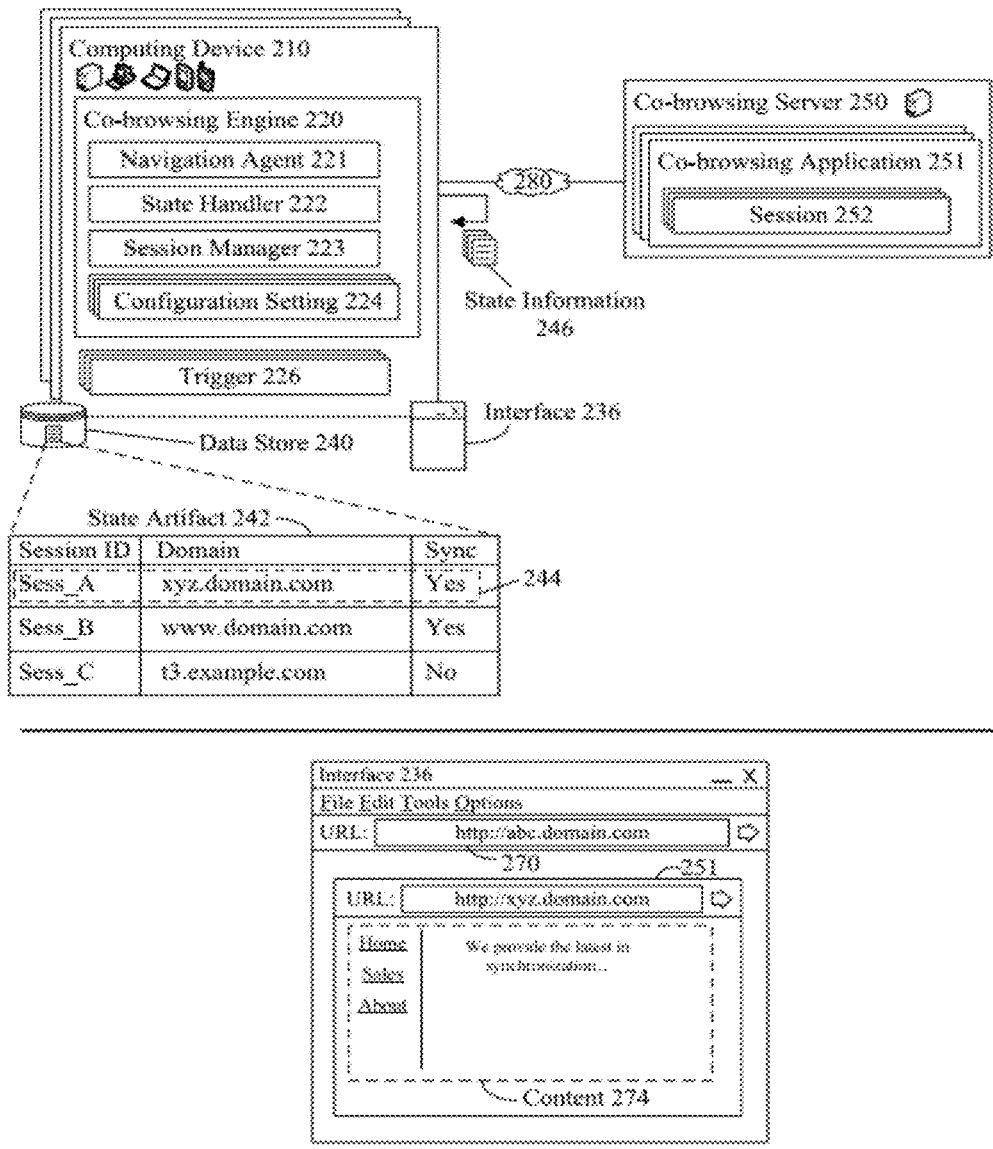
FIG. 2 is a schematic diagram illustrating a system for improving multi-domain co-browsing utilizing localized state management in accordance with an embodiment of the inventive arrangements disclosed herein.

FIG. 2 is a schematic diagram illustrating a system 200 for improving multi-domain co-browsing utilizing localized state management in accordance with an embodiment of the inventive arrangements disclosed herein. System 200 can be present in the context of method 100 and/or interface 300. In system 200, a co-browsing engine 220 can provide stateful management of session 252 for multiple domains. Traditional state management for multiple domain co-browsing sessions include the use of a proxy server. The disclosure is distinctly different from traditional state management through the use of localized processing within computing device 210 which do not employ a proxy server. That is, the disclosure can present a client side solution for state management and routing which can rely upon the client side resources. For example, the solution can be leveraged to extend Hypertext Transport Protocol and Session Initiated Protocol state management utilizing co-browsing engine 220.

The advantage the disclosure presents over existing solutions permits computing device 210 to efficiently determine co-browsing session domain changes for the current session. In addition, the disclosure can allow state management transference from a current domain to a different domain without impacting server 250 performance and/or adding additional HTTP requests to the server 250.

System 200 can be a client-server architecture implementing a Service Oriented Architecture. In system 200, Web-enabled services can provide co-browsing application availability to computing device 210. System 200 can rely upon traditional and/or proprietary communication mechanisms and data formats. Communication mechanisms associated with system 200 can include, but is not limited to, Transport Control Protocol (TCP), Internet Protocol (IP), User Datagram Protocol (UDP), Session Initiated Protocol (SIP), Hypertext Transfer Protocol (HTTP), Simple Object Access Protocol (SOAP), and the like. Data formats can include, but is not limited to, Extensible Markup Language (XML), Hypertext Markup Language (HTML), Extensible HTML (XHTML) Standard General Markup Language (SGML), and the like.

As used herein, a computing device 210 can include, but is not limited to, a master computing device, a slave computing device, multiple master computing devices, multiple slave computing devices, and the like. In system 200, a computing device 210 can be communicatively linked to a co-browsing server 250 via network 280. It should be appreciated that each computing device 210 associated with a co-browsing session 252 can include a co-browsing engine 220. In one embodiment, co-browsing session 252 can be traditionally established. In another embodiment, co-browsing session 252 can be established in a proprietary manner. In one embodiment, co-browsing session 252 can be associated with an IBM WEBSPHERE APPLICATION SERVER COMMUNICATION ENABLED APPLICATION.

Co-browsing server 250 can be a hardware/software entity able to host a co-browsing application 251. Server 250 can include, but is not limited to, co-browsing application 251, a configuration setting, a data store, and the like. Server 250 functionality can include, executing application 251, servicing a remote procedure call, maintaining session data, and the like. In one instance, server 250 can be an IBM WEBSPHERE APPLICATION SERVER software. It should be appreciated that server 250 can include, but is not limited to, an application server, a proxy server, and the like.

Co-browsing application 251 can be a software entity able to facilitate a co-browsing session 252. Application 251 can conform, but is not limited to, a desktop co-browsing application, a Web-based co-browsing application, a remotely executing application, and the like. Application 251 can include, but is not limited to, a collaboration application, a text exchange application, a videoconferencing application, and the like. Application 251 can utilize one or more technologies including, but not limited to, JAVA 2 ENTERPRISE EDITION (J2EE), JAVA 2 STANDARD EDITION (J2SE), and the like. It should be appreciated that application 251 can include multiple co-browsing applications associated with multiple domains. That is, the disclosure can permit application 251 session state to be migrated to a different application.

Co-browsing session 252 can be a data element associated with a co-browsing application 251. Co-browsing session 252 can include, but is not limited to, session identifier, computing device identifier, user identifier, timeout data, and the like. Session 252 can conform to, but is not limited to, a database, a file, and the like. In one embodiment, session 252 can be associated with server 250. In another embodiment, session can be associated with computing device 210.

Computing device 210 can be a hardware/software entity associated with a co-browsing engine 220. Device 210 can include, but is not limited to co-browsing engine 220, application 251, data store 240, interface 236, and the like. Device 210 can include a desktop computer, laptop, mobile phone, tablet computing device, personal digital assistant (PDA), portable computing device, and the like. It should be appreciated that computing device 210 is not a proxy server. Computing device 210 can be, but is not limited to, a thin client, a fat client, a hybrid client, and the like.

Co-browsing engine 220 can be a hardware/software component for managing a session state associated a co-browsing session spanning multiple domains. Engine 220 can include, but is not limited to, navigation engine 221, state handler 222, session manager 223, configuration setting 224, and the like. In one embodiment, engine 220 can be a portion of a co-browsing application 251. In another embodiment, engine 220 can be a functionality encapsulated within an application programming interface (API). In yet another embodiment, engine 220 can be a portion of a operating system service executing within device 210. It should be understood that engine components 221-225 can be optional components permitting engine 220 functionality is maintained.

Navigation agent 221 can be a hardware/software element able to perform navigation actions in response to a co-browsing application 251 request. Agent 221 functionality can include, but is not limited to, retrieving content, presenting content, traversing content, and the like. Content can include, but is not limited to, documents, multi-media, software applications, and the like. For instance, content can be an embedded video within a Web page. Agent 221 can interact with convention and/or non conventional network resources including, but not limited to, a Uniform Resource Identifier (URI), a Uniform Resource Locator (URL), and the like. In one embodiment, agent 221 can be a portion of a local domain service. For instance, agent 221 can be a functionality of a client side domain name server.

State handler 222 can be a hardware/software entity for performing state management functions associated with session 252. Handler 222 functionality can include, but is not limited to, tracking state elements, storing state data, auditing state information, replicating state artifact 242, conveying state artifact 242 and the like. In one embodiment, handler 222 can utilize state artifact 242 to store and/or retrieve state information in real-time. In the embodiment, state handler 222 can provide synchronization functionality during a co-browsing session. In the embodiment, state handler 222 can convey state artifact 242 as state information 246 to computing devices associated with the co-browsing session 252.

Session manager 223 can be a hardware/software element able to control a co-browsing session. Manager 223 functionality can include, but is not limited to, session control transfer, session control management, session initiation, session termination, and the like. In one instance, manager 223 can permit migration of a session from one co-browsing application to a different co-browsing application. In the instance, manager 223 can negotiate traditional and/or proprietary session initiation and termination operations to facilitate session state migration. In another instance, manager 223 can be utilized to transfer session control between computing devices. In the instance, manager 223 can utilize a traditional and/or proprietary mechanisms to indicate session control among two or more computing devices. In one embodiment, non-state session information can be synchronized utilizing manager 223.

State artifact 242 can be a data set for maintaining the state of a co-browsing session 252. State artifact 242 data set can include, but is not limited to, state information, historic state information, and the like. State information can include, but is not limited to, domain requests, authentication information, security permissions, user identity, preferences, and the like. In one instance, state artifact 242 can be stored within data store 240 which can be a read-only memory (ROM) medium. In the instance, data store 240 can cache state artifact 242 during a co-browsing session 252. In another instance, state artifact 242 can be stored within a random access memory medium (RAM) for improved security. In the instance, state artifact 242 can be stored within a protected memory region permitting secure access to session 252 state.

Configuration setting 224 can be one or more parameters for controlling the behavior of co-browsing engine 220. Setting 224 can include, but is not limited to, state artifact management options, authentication settings, application 251 settings, user preferences, and the like. Setting 224 can be automatically determined, manually determined and the like. In one instance, setting 224 can be synchronized with a computing device within a shared co-browsing session. That is, common settings can be easily replicated across multiple computing devices.

Trigger 226 can be a mechanism for determining a domain change within session 252. Trigger 226 can include, but is not limited to, a ruleset, a pattern matching rule, and the like. For example, trigger 226 can be a Uniform Resource Locator parser able to detect a different domain request. Trigger 226 can include, but is not limited to, automatically established triggers, manually established triggers, and the like. Trigger 226 can be stored within engine 220, data store 240, and the like. For instance, a trigger 226 can be created to allow session migration from a domain 270 (e.g., abc.domain.com) to a different domain (e.g., xyz.domain.com).

Interface 236 can be a hardware/software element for interacting with a co-browsing application 251 and/or co-browsing session 252. Interface 236 can include, but is not limited to, a software application screen, a Web browser, and the like. Interface 236 can be communicatively linked to computing device 210. Interface 236 can present Uniform Resource Identifier content, configuration setting 224, application 251, and the like. In one instance, interface 236 can present a co-browsing application 251 which can include content 274.

It should be appreciated that application 251 can include multiple co-browsing applications 230. In one embodiment, system 200 can permit multiple co-browsing applications to exchange state information as navigation occurs. In the embodiment, engine 220 can migrate session 252 state from one co-browsing application 251 to another co-browsing application. It should be appreciated that system 200 can operate transparently without requiring user interaction and/or intervention.

In one embodiment, engine 220 can be a downloadable component able to dynamically extend state capabilities in real-time. For instance, a device which lacks engine 220 can be temporarily enhanced for the duration of session 252. In the embodiment, engine 220 can execute as an intermediary layer processing application 251 requests and maintaining the state of session 252. In one instance, engine 220 can be configured to provide varying levels of state management based on computing device 210 resources, usage requirements, and the like. In one embodiment, engine 220 can permit a "slave-only" mode which can only receive state information. In the embodiment, engine 220 can communicate with a "master" mode engine 220 to receive state information.

Drawings presented herein are for illustrative purposes only and should not be construed to limit the invention in any regard. In one instance, engine 220 can be a functionality of a Web browser. In the instance, engine 220 can be a plug-in component of a Web browser. It should be appreciated that system 200 can be one embodiment for enabling co-browsing state management over multiple domains. Other embodiments including similar functionality are contemplated. It should be understood that information not associated with session state can be conveyed to server 250 in a traditional and/or proprietary manner. In one instance, system 200 can be a component of a computer program product. In the instance, system 200 can be associated with an IBM WEBSPHERE APPLICATION SERVER software.

Figure 3:
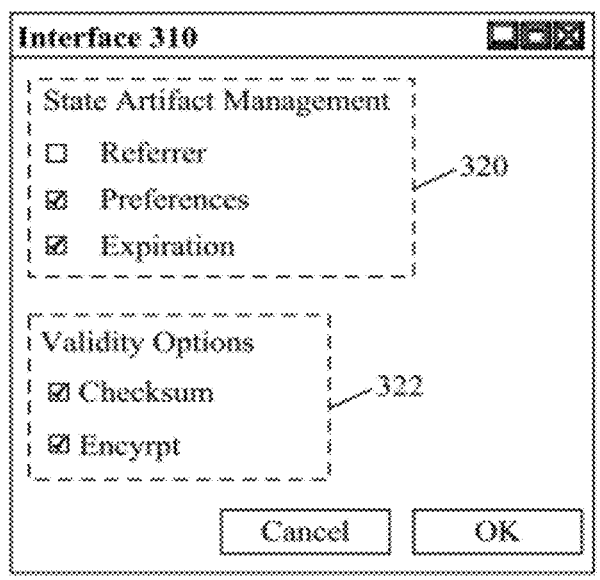
FIG. 3 is a schematic diagram illustrating an interface for improving multi-domain co-browsing utilizing localized state management in accordance with an embodiment of the inventive arrangements disclosed herein.

FIG. 3 is a schematic diagram illustrating an interface 310 improving multi-domain co-browsing utilizing localized state management in accordance with an embodiment of the inventive arrangements disclosed herein. Interface 310 can be present in the context of method 100 and system 200. In interface 310, state artifact replication can be flexibly configured based on session requirements, user requirements, system constraints, and the like. It should be appreciated that interface 310 can present additional configuration parameters not presented herein. Interface 310 can be a screen of a configuration menu interface, pop-up dialog interface, context menu interface, and the like.

In section 320, state artifact management options can be presented. State artifact management options can include, but is not limited to, referrer data, preferences, expiration information, and the like. In one instance, section 320 can permit the customization of state artifact replication. In one configuration of the instance, selection of options within section 320 can affect a current co-browsing session. In another configuration of the instance, options within section 320 can be utilized to apply global settings to active co-browsing sessions.

In section 322, options for maintaining state artifact data validity and integrity can be presented. Data validity options can include, but is not limited to, checksum, encryption, authentication, and the like. Section 322 can allow customization for utilizing the disclosure within existing security policies. Checksum can include, but is not limited to, hashing checksums, fingerprint checksums, and the like. Encryption can include traditional and/or proprietary encryption mechanisms.

Drawings presented herein are for illustrative purposes only and should not be construed to limit the invention in any regard. Interface 300 interface artifacts can include, but is not limited to, radio dialogs, checkboxes, drop down selection boxes, multi-selection boxes, and the like. Interface 300 can be customizable based on system capabilities, co-browsing application requirements, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for improved multi-domain co-browsing comprising:
identifying a master and a slave computing devices within a co-browsing session, wherein the master and slave devices are associated with a first Unified Resource Identifier (URI), wherein at least a portion of the URI is a fully qualified domain name of a Domain Name System (DNS) hierarchy, wherein the master and slave computing devices are associated with a co-browsing application;
detecting a request associated with a second URI from the master computing device, wherein the second URI shares a root domain with the first URI;
conveying at least a portion of a master artifact associated with the master computing device to the slave computing device, wherein the master artifact is associated with state information of the co-browsing session;

modifying at least a portion of a slave artifact linked to the slave computing device with the portion of the master artifact; and navigating the master and slave computing devices to the second URI in response to request.

2. The method of claim 1, wherein the master artifact and slave artifact is an Hypertext Transport Protocol (HTTP) cookie.

3. The method of claim 1, wherein the first and second URI is associated with at least one of a different networking port, networking protocol, and computing resource.

4. The method of claim 1, wherein the request is a Asynchronous JavaScript and Extensible Markup Language (AJAX) request.

5. The method of claim 1, wherein the detecting is performed by a pattern matching functionality.

6. The method of claim 1, wherein the pattern matching functionality is a regular expression functionality.

7. The method of claim 1, wherein the co-browsing application is a Web-enabled application executing within an interface.

8. The method of claim 1, wherein the method is performed via a DOJO toolkit application programming interface (API).

9. The method of claim 1, wherein the co-browsing session is associated with at least an HTTP session and a Session Initiated Protocol (SIP) session.

10. A method for improving multi-domain co-browsing comprising:

receiving a request for a Uniform Resource Locator (URI) associated with a first co-browsing application, wherein the URI is a fully qualified domain name of a Domain Name System hierarchy (DNS), wherein the URI shares a common domain name with a historic URI, wherein the first co-browsing application is associated with a co-browsing session, wherein the co-browsing session is associated with a state artifact, wherein the first co-browsing application is associated with a client computing device;

identifying state information of the state artifact associated with the first co-browsing application, wherein the state information is at least one of a session identifier and a domain; and replicating the state information of the state artifact to a second co-browsing application by modifying a second co-browsing application state artifact with the state information, wherein the second co-browsing application is associated with a different computing device.

11. The method of claim 10, wherein the replicating is the duplication of name/value pairs from a first co-browsing application to the second co-browsing application.

12. They method of claim 10, wherein the state artifact is a Hypertext Transport Protocol (HTTP) cookie.

13. A method for improved multi-domain co-browsing comprising:

identifying a master and a slave computing devices within a co-browsing session, wherein the master and slave devices are associated with a first Unified Resource Identifier (URI), wherein at least a portion of the URI is a fully qualified domain name of a Domain Name System (DNS) hierarchy, wherein the master and slave computing devices are associated with a co-browsing application;

detecting a request associated with a second URI from the master computing device, wherein the second URI shares a root domain with the first URI;

conveying at least a portion of a master artifact associated with the master computing device to the slave computing device, wherein the master artifact is associated with state information of the co-browsing session;

modifying at least a portion of a slave artifact linked to the slave computing device with the portion of the master artifact, wherein the master artifact and slave artifact is an Hypertext Transport Protocol (HTTP) cookie;

maintaining the same state information for the master computing device to the slave computing device associated with the co-browsing session;

and navigating the master and slave computing devices to the second URI in response to request.

14. The method of claim 13, wherein the first and second URI is associated with at least one of a different networking port, networking protocol, and computing resource.

15. The method of claim 13, wherein the request is a Asynchronous JavaScript and Extensible Markup Language (AJAX) request.

16. The method of claim 13, wherein the detecting is performed by a pattern matching functionality.

17. The method of claim 13, wherein the pattern matching functionality is a regular expression functionality.

18. The method of claim 13, wherein the co-browsing application is a Web-enabled application executing within an interface.

19. The method of claim 13, wherein the method is performed via a DOJO toolkit application programming interface (API).

20. The method of claim 13, wherein the co-browsing session is associated with at least an HTTP session and a Session Initiated Protocol (SIP) session.

* * * * *